(12) United States Patent
Sandholm et al.

(10) Patent No.: US 10,244,065 B2
(45) Date of Patent: Mar. 26, 2019

(54) DEVICE PAIRING FOR CONTENT SHARING

(71) Applicant: Hewlett-Packard Development Company, L.P., Houston, TX (US)

(72) Inventors: Thomas E. Sandholm, Palo Alto, CA (US); Anupriya Ankolekar, Palo Alto, CA (US); Bernardo Huberman, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 241 days.

(21) Appl. No.: 14/781,730

(22) PCT Filed: Apr. 3, 2013

(86) PCT No.: PCT/US2013/035133
§ 371 (c)(1),
(2) Date: Oct. 1, 2015

(87) PCT Pub. No.: WO2014/163631
PCT Pub. Date: Oct. 9, 2014

(65) Prior Publication Data
US 2016/0044122 A1    Feb. 11, 2016

(51) Int. Cl.
*H04W 4/06*    (2009.01)
*H04W 4/21*    (2018.01)
(Continued)

(52) U.S. Cl.
CPC .......... *H04L 67/26* (2013.01); *H04L 51/04* (2013.01); *H04L 51/18* (2013.01); *H04W 4/06* (2013.01); *H04W 4/21* (2018.02); *H04W 4/80* (2018.02)

(58) Field of Classification Search
None
See application file for complete search history.

(56) References Cited

U.S. PATENT DOCUMENTS 8,823,494 B1 * 9/2014 Kovitz ............... H01Q 1/2225
340/10.1
2005/0108299 A1    5/2005 Nakajima
(Continued)

FOREIGN PATENT DOCUMENTS

| JP | 2007257179 | 10/2007 |
|---|---|---|
| JP | 2010267073 | 11/2010 |
| JP | 2012128569 | 7/2012 |

OTHER PUBLICATIONS

International Searching Authority, The International Search Report and the Written Opinion, dated Jan. 9, 2014, 10 Pages.
(Continued)

*Primary Examiner* — Kevin T Bates
*Assistant Examiner* — Lesa M Kennedy
(74) *Attorney, Agent, or Firm* — Hewlett Packard Enterprise Patent Department (57) ABSTRACT

A computer-implemented method, system, and non-transitory computer readable medium for device pairing for content sharing are disclosed. An encoded URL is accessed in a first device, the encoded URL associated with a second device. A content group identifier is provided to the second device. The second device is notified that content is ready to be pushed to the second device from the first device through the content group. Content is pushed from the first device to the second device through the content group.

14 Claims, 8 Drawing Sheets

(51) Int. Cl.
  *H04W 4/80* (2018.01)
  *H04L 12/58* (2006.01)
  *H04L 29/08* (2006.01)

(56) References Cited

U.S. PATENT DOCUMENTS

| | | |
|---|---|---|
| 2010/0138797 A1 | 6/2010 | Thorn |
| 2010/0278345 A1* | 11/2010 | Alsina ................ H04L 63/0492 380/283 |
| 2012/0030584 A1 | 2/2012 | Bian |
| 2012/0036225 A1* | 2/2012 | Chor ...................... H04L 67/02 709/219 |
| 2012/0059875 A1* | 3/2012 | Clark .................... G06F 3/0484 709/203 |
| 2012/0066602 A1 | 3/2012 | Chai et al. |
| 2012/0238216 A1 | 9/2012 | Hallowell et al. |
| 2012/0282914 A1 | 11/2012 | Alexander |
| 2012/0287022 A1 | 11/2012 | Queen |
| 2013/0055323 A1* | 2/2013 | Venkitaraman .... H04N 21/4126 725/82 |
| 2013/0191762 A1* | 7/2013 | Rajagopalan ....... H04L 12/1818 715/753 |
| 2014/0187149 A1* | 7/2014 | Lortz ................... H04W 4/008 455/41.1 |

OTHER PUBLICATIONS

Panasonic Smart TV System 2012 Review, (Web Page), Retrieved Sep. 28, 2015, 6 Pages.

* cited by examiner

DEVICE PAIRING FOR CONTENT SHARING

CROSS-REFERENCE TO RELATED APPLICATIONS

This application is related to PCT Patent Application Ser. No. PCT/US2012/057438, entitled "Sharing Content Between Collocated Mobile Devices in an Ad-Hoc Private Social Group", filed on Sep. 27, 2012, assigned to the assignee of the present application and incorporated by reference herein.

BACKGROUND

The proliferation of the Internet has facilitated the sharing and distribution of content like never before. Users now flock to websites, search engines, and social networks to access and share content from multiple devices and locations around the world. The devices may include personal and portable computers, phones, tablets, video game consoles, personal digital assistants, smart TVs, printers, or any device configured to access the Internet. The access may be wired or wireless, with wireless access growing much faster. It is predicted that by 2016 there will be more wireless devices than people in the world.

Along with the rise in popularity if wireless services, there has been a growing demand for content sharing platforms that are targeted specifically for the mobile user. These include, for example, Instagram for sharing photos, Foursquare for sharing location information, Facebook Mobile and Google+ Mobile for sharing documents, among others. These content sharing platforms enable users to easily share content among their social network peers. However, they are not optimized to let users share and interact with content instantly and securely in real-time in social groups in arbitrary devices.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

A content sharing platform for pairing arbitrary devices for sharing content between the devices is disclosed. The content sharing platform enables users in a content group to share, collaborate, and interact with content seamlessly across mobile devices in real-time. The mobile devices may be physically collocated in a physical venue such as, for example, a conference or meeting room, or located remotely. The content group may be formed by invitation or by automatically discovering the users' location.

In various examples, the content sharing platform may be accessed from a web page without any plug-ins and across any number of devices, operating systems, and browsers. The content sharing platform may also support numerous form factors, all the way from big projector screens down to small screen sizes in mobile phones. Users of the content sharing platform may share, interact and collaborate with content in real-time.

As described in more detail herein below, a user of a first device (e.g., compute, laptop, tablet, phone, etc.) can seamlessly and securely push content via the web to a second device such as a smart display (e.g., smart TV, monitor, etc.) or a printer. The content is pushed by having the first device read an encoded URL (e.g., Quick Response ("QR") code, Near Field Communication ("NFC") tag, etc.) associated with the second device, provide a content group identifier to the second device, and notify the second device that content is ready to be pushed to the second device through the content group. The second device can be any device capable of connecting to the Internet. In the case of the second device being a smart display, the device has a web browser that allows it to open up a URL associated with the content sharing platform that enables content sharing in a content group. In the case of the second device being a printer, the device is connected to a printer spooler service that enables content from a content group to be shared with the printer for printing.

As described in more detail below, the content sharing platform has three main modules: (1) a web-based user interface module to enable users to share, interact and collaborate with content in a content group; (2) a real-time messaging module to process events and messages between devices to be paired; and (3) a content sharing module to interact with the real-time messaging module to push content from a content group from a first device to a second device by accessing, at the first device, an encoded URL associated with the second device.

It is appreciated that, in the following description, numerous specific details are set forth to provide a thorough understanding of various examples. However, it is appreciated that the examples may be practiced without limitation to these specific details. In other instances, well known methods and structures may not be described in detail to avoid unnecessarily obscuring the description of the examples. Also, the examples may be used in combination with each other.

Figure 1:
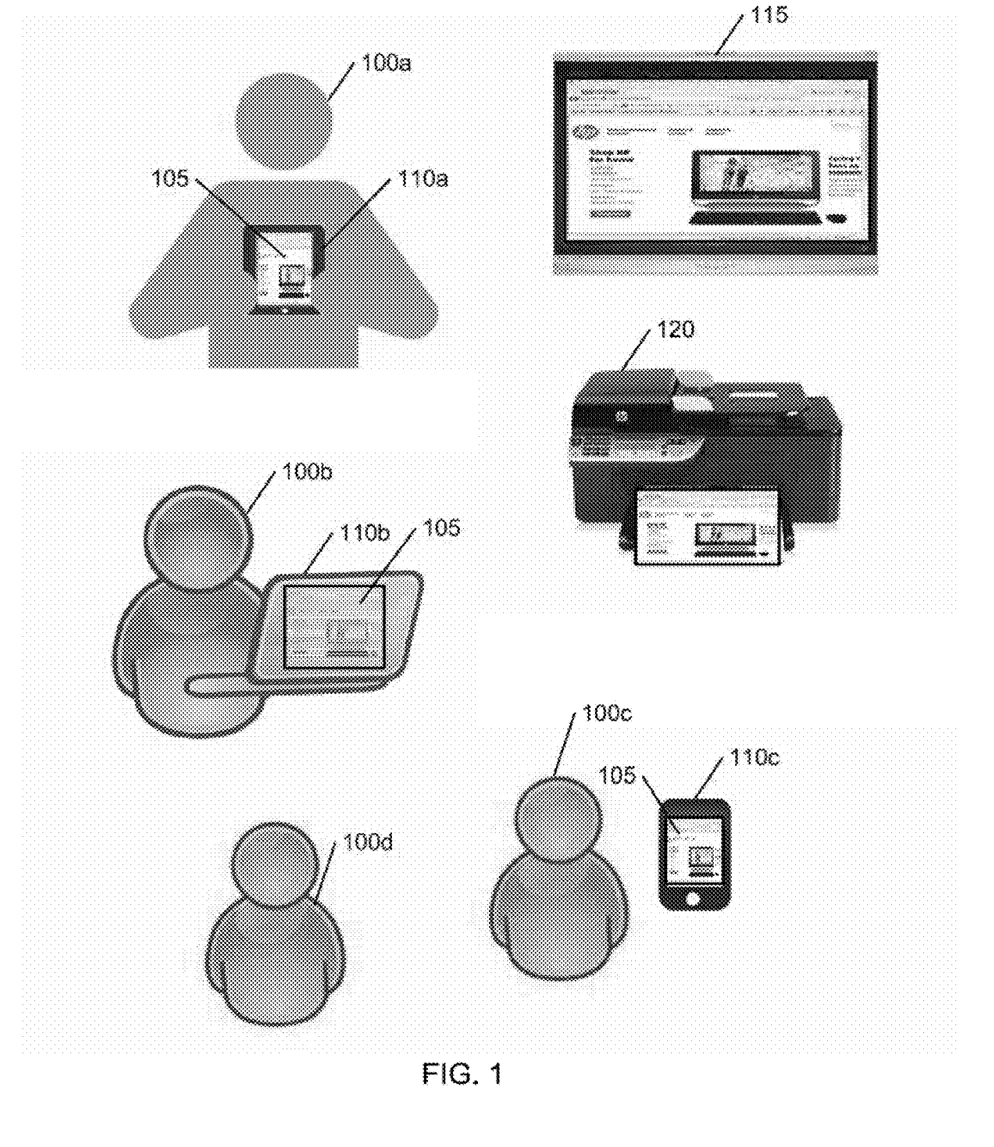
FIG. 1 illustrates a schematic diagram of an environment where a content sharing platform is used in accordance with various examples.

Referring now to FIG. 1, a schematic diagram of an environment where the content sharing platform is used in accordance with various examples is described. User 100a would like to share, interact, and collaborate with content viewed in his/her mobile device. As an example, suppose user 100a would like to share a web page 105 with other users 100b-d and show them how to navigate the web page 105 (e.g., in a training scenario where user 100a has to train users 100b-d on how to use the various functions on the page, in a publishing scenario where user 100a is showing users 100b-d how the content on the web page will look like, and so on). User 100a may be accessing the web on a tablet 110a, user 100b may be accessing the web on a laptop 110b, user 100c may be accessing the web on a smartphone 110c, and user 100d may be located in the same room as user 100a or located remotely from user 100*a*. User 100*d* may or may not have a mobile device with him/her at the time, so user 100*a* would like to share the web page 105 with user 100*d* by displaying it in a smart display 115 (e.g., a smart display projector in a room where user 100*d* is located or by printing the web page in a printer 120 accessible by user 100*d*.

In doing so, user 100*a* would like the sharing of web page 105 with smart display 115 and printer 120 to be as seamless and secure as possible, so that only those allowed to see the content are able to do so. The smart display 115 and printer 120 are both equipped to connect to the Internet. Instead of having to hookup his/her device to the smart display 115 or access a printing application in his/her device, user 100*a* is able to access a web-based user interface module (described in more detail herein below) to share the web page 105 with the smart display 115 and/or printer 120, relying solely on the Internet capabilities of the smart display 115 and printer 120. All that is required of smart display 115 and printer 120 to receive the web page 105 (or any other content shared by user 100*a*) is an Internet connection.

In various examples, the users 100*a-b* share content in a content group that may be formed by invitation or by automatically discovering the users' location (e.g., via GPS or Wi-Fi positioning). The content group is identified by a reference identifier, such as, for example, a URL that can be shared with users in the group by email, Short Message Service ("SMS"), Quick Response ("QR") code, Near Field Communication ("NFC") tags, local group broadcast, or any other channel that may be used to communicate a URL. As described in more detail herein below, the URL directs the users 100*a-c* to a web-based user interface that enables them to share, interact and collaborate with content seamlessly in real-time from their devices 110*a-c*. User 100*d* may view the content displayed in smart display 115 or printed in printer 120.

Figure 2:
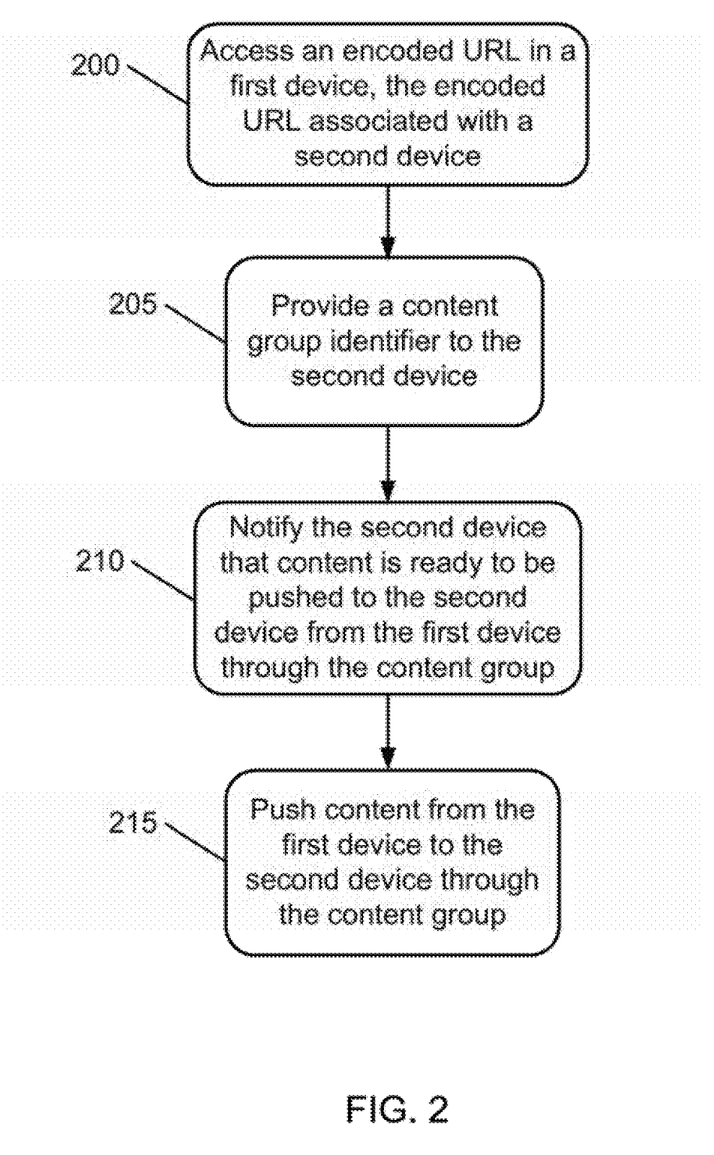
FIG. 2 illustrates a flowchart for sharing content between paired devices through a content group.

Referring now to FIG. 2, a flowchart for sharing content between paired devices in a content group is described. First, a user of a first device (e.g., desktop, laptop, tablet, smart phone, smart watch, video game console, personal digital assistant, etc.) accesses an encoded URL associated with the second device (200). The encoded URL may be encoded as a QR code, NFC tag, or any other way of encoding an URL. The user of the first device may access the encoded URL in a number of ways, such as, for example, by using a QR code reader or NFC tag reader. In one example, the user accesses a web page in the second device (e.g., a smart display) to see the QR code. In another example, the user is co-located with the second device (e.g., a printer) and can simply read the encoded URL from the second device.

Next, the first device provides a content group identifier to the second device (205). The encoded URL encodes a device URL associated with the second device and it is used to communicate references to content groups containing content on other devices. The device URL encodes a unique device identifier for the second device as well as a web socket channel for communication with the first device. This web socket channel is referred to herein as a device channel. As described in more detail below with reference to FIGS. 3A-B, when the first device accesses the encoded URL (e.g., by reading a QR code or NFC tag), a web browser in the first device opens up the device URL and it is redirected to a transitional web page. This transitional web page obtains the device identifier of the second device from the device URL's parameters, obtains the device channel also form the device URL's parameters, reads a cookie that identifies the last content group accessed in the first device via the content sharing platform, and provides the content group identifier to the second device on the device channel. It is appreciated that the user of the first device does not see the transitional web page on his/her browser; the transitional web page is redirected to a content group page immediately after it performs the steps described above.

Next, the second device is then notified that content is ready to be pushed to the second device from the first device through the content group (210). The first device sends a group content identifier (e.g., a name associated with the content group) to the second device through the device channel. The second device, upon receiving the content group identifier, subscribes to a web socket channel associated with the content group to receive the content. This web socket channel associated with the content group is referred to herein as the content group channel.

Lastly, the content in the content group is pushed from the first device to the second device through the content group (215). The content is pushed by having the first device send references (e.g., URLs) to the content in the content group to the second device via the content group channel. The second device receives the references, downloads the content from the references, and either displays it in the case of a smart display or sends it to a spooler service in the case of a printer. It is appreciated that the first device does not know—and does not need to know—what kind of device it is being paired with. All notifications and content are sent through web socket channels (i.e., the device channel and the content group channel) and the first device does not care what device is on the other side of the the second device.

Figure 3A:
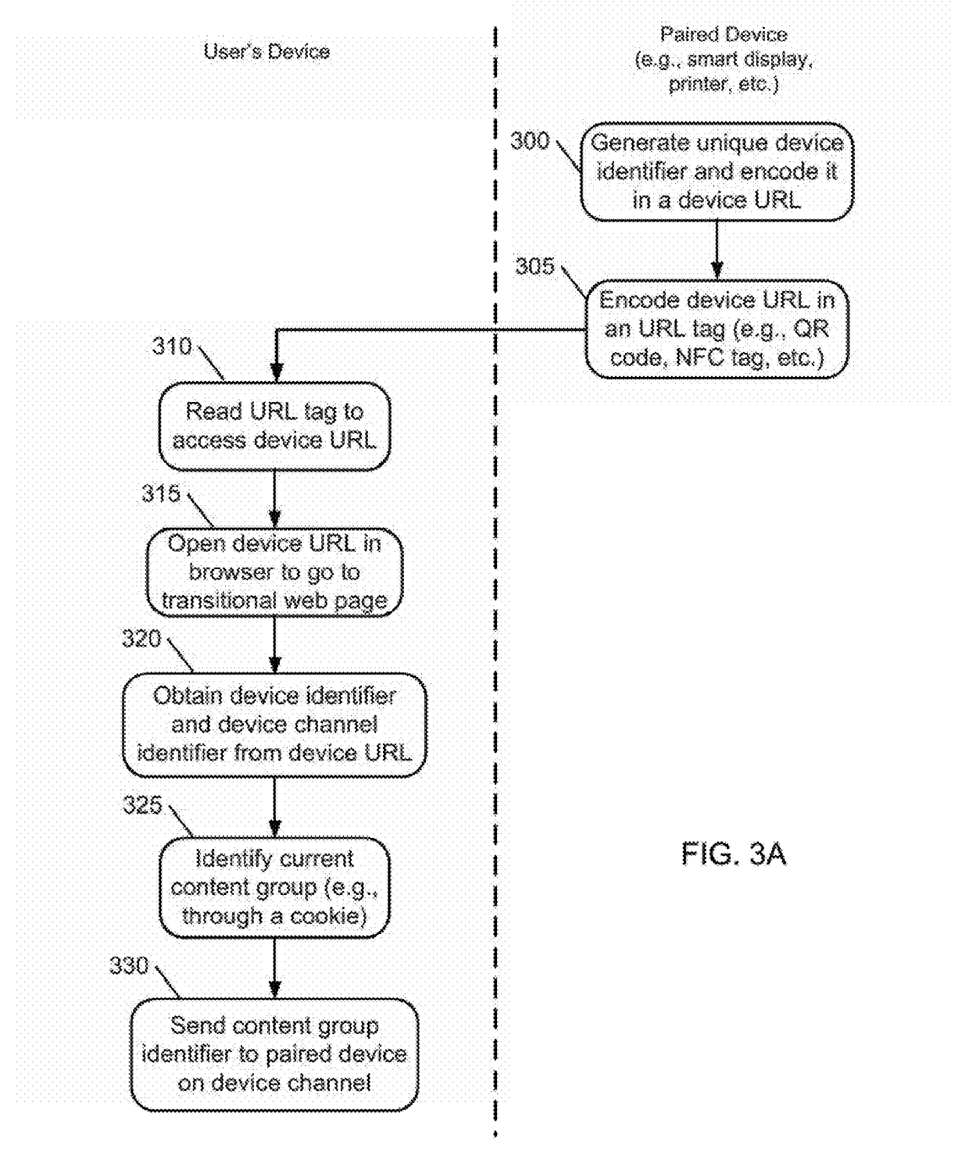
FIGS. 3A-B illustrate more detailed flowcharts for sharing content between paired devices through a content group.
Figure 3B:
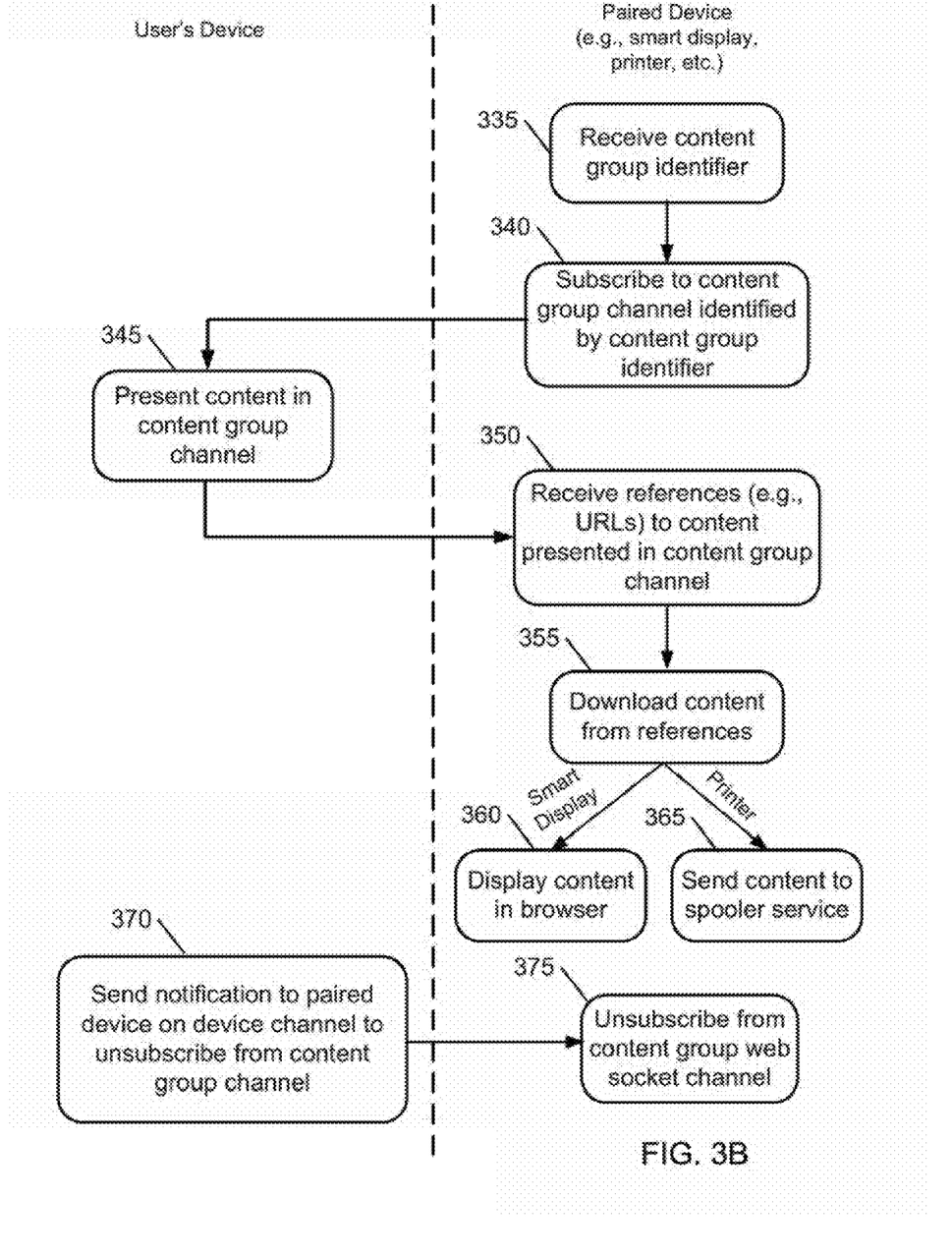

Attention is now directed to FIGS. 3A-B, which illustrate more detailed flowcharts for sharing content between paired devices in a content group. First, a device to be paired with a user's device (e.g., smart display or printer) generates a unique device identifier and encodes it in a device URL (300). The device URL also encodes a web socket channel (i.e., a device channel) for communication with the user's device. Next, the device URL is encoded in a URL tag, such as a QR code, NFC tag, or any other tag for encoding an URL (305). The first device reads the URL tag to access the device URL, e.g., by using a QR code reader or NFC tag reader (310). The device URL is opened by a web browser and the browser is redirected to a transitional web page (315). The transitional web page obtains the device identifier and the device channel from the device URL's parameters. (320). The transitional web page also identifies the last content group accesses at the first device, e.g., by using a cookie (325), and sends a content group identifier to the paired device on the device channel (330).

Next, as shown in FIG. 3B, the paired device receives the content group identifier in the device channel (335) and subscribes to a content group identified by the content group identifier (340). It is appreciated that the device channel and the content group channel are different web socket channels. The different channels are used so that the content group can be disassociated from the paired device. The paired device can use the device channel to send a new pairing request from a third device and another content group channel to receive content from the third device. The content group channels are private channels only known between the device sharing the content and the device receiving the content.

The user's device then starts presenting content in the content group (345), and the paired device receives references (e.g., URLs) to the content in the content group channel it is subscribed to (350). The paired device then downloads the content from the references (355). In the case of a smart display, the content is downloaded from the references and displayed in a browser of the smart display (360). In the case of a printer, the content is sent to a spooler service (365). Lastly, when the user desires to stop the sharing of content with the paired device, the user's device sends a notification to the paired device on the device channel (370). The paired device receives the notification and unsubscribes from the content group channel to stop displaying or printing the content from the first device (375).

Figure 4:
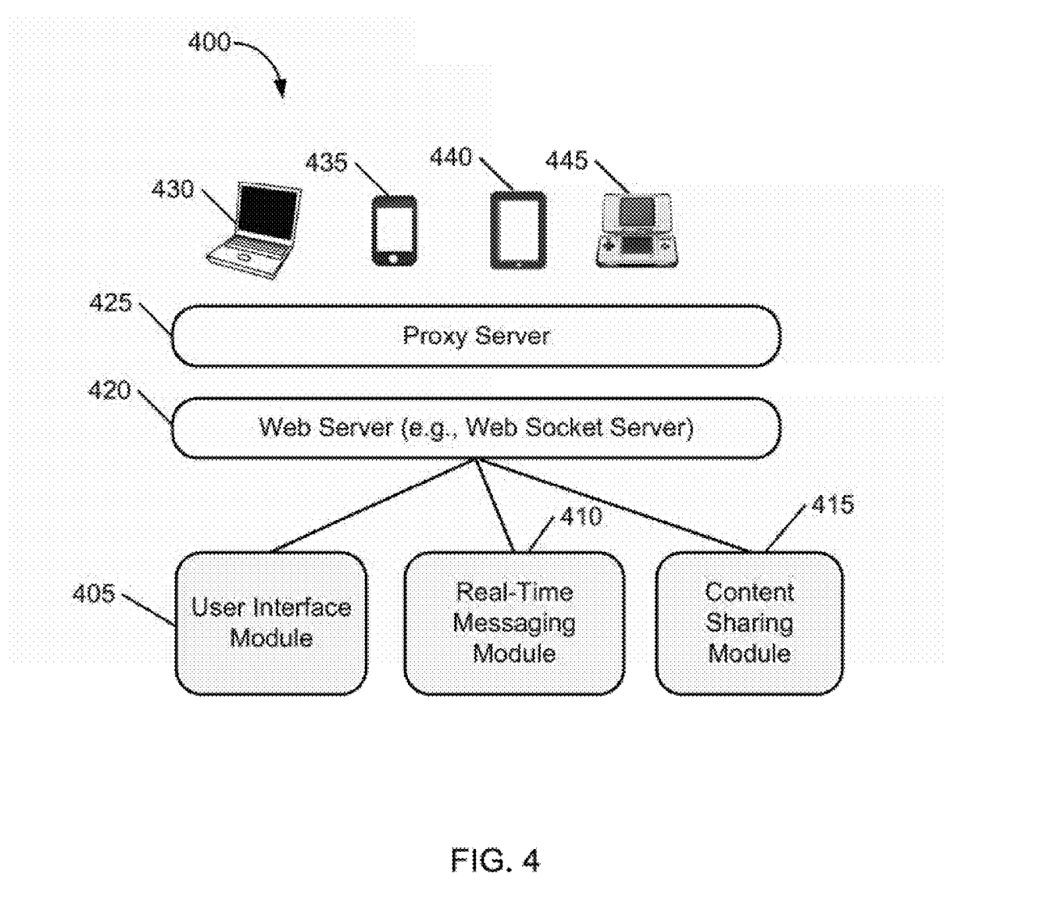
FIG. 4 illustrates a schematic diagram of a content sharing platform architecture in accordance with various examples.

Referring now to FIG. 4, a schematic diagram of a content sharing platform architecture in accordance with various examples is described. Content sharing platform 400 has various modules hosted on one or more servers, including, for example: (1) a User Interface Module 405; (2) a Real-Time Messaging Module 410; and (3) a Content Sharing Module 415. In various examples, the content sharing platform 400 is hosted on a web server 420 connected to an optional proxy server 425. The proxy server 425 may be a standard web server (e.g., an Apache2 server) with mod_proxy and mod_rewrite modules to ensure that consistent URLs are exposed to users of the content sharing platform 400. The users may access the content sharing platform 400 through a URL request to the proxy server 425 on a number of mobile devices, such as for example, laptop 430, phone 435, tablet 440, and video game console 445, among others. The URL request directs the users of the content sharing platform 400 to a user interface implemented by the User Interface Module 405.

It is appreciated that the proxy server 425 may be deployed as part of a cloud service and optionally be collocated with the web server 420. It is also appreciated that having proxy server 425 issue consistent URLs enables cookies issued by the various content sharing platform 400 modules to be shared among the modules. The web server 420 may also be a web sever (e.g., an Apache 2 server) with minimal dependencies on images and external libraries to facilitate replication and load balance. In an example implementation, the web server 420 may use the jQuery library to make Ajax calls and the html 5 web sockets library to make socket calls to the Real-Time Messaging Module 410.

The User Interface Module 405 enables users to share, interact, and collaborate with content in a content group. The Real-Time Messaging Module 410 is responsible for processing events and messages between devices to be paired, e.g., between a first device such as devices 430-445 and a second device such as a smart display or a printer. The Content Sharing Module 420 interacts with the Real-Time Messaging Module 410 to push content from a first device to a second device through a content group.

In various examples, the Real-Time Messaging Module 410 may be implemented as a Node.Js server with two types of Application Programming Interfaces ("APIs"): a standard HTTP/Post/Get/Rest API and a WebSocket API through the html 5 web sockets library. The two APIs enable various web clients (e.g., the mobile devices 430-445) to push events and messages through the Real-Time Messaging Module 410. The WebSocket API is used to receive notifications and messages in real-time. In one example, the Rest API may also be used for this purpose but with a loss in efficiency. The Content Sharing Module 415 may be implemented as a set of Linux scripts using ImageMagick, OpenOffice, Poppler, and Ghostscript.

It is appreciated that the content sharing platform 400 may have additional modules not shown in FIG. 4. For example, the content sharing platform 400 may have various modules to allow the sharing of other content (e.g., documents) with users in the social group, including a spooler service to communicate and share content with a printer.

Figure 5:
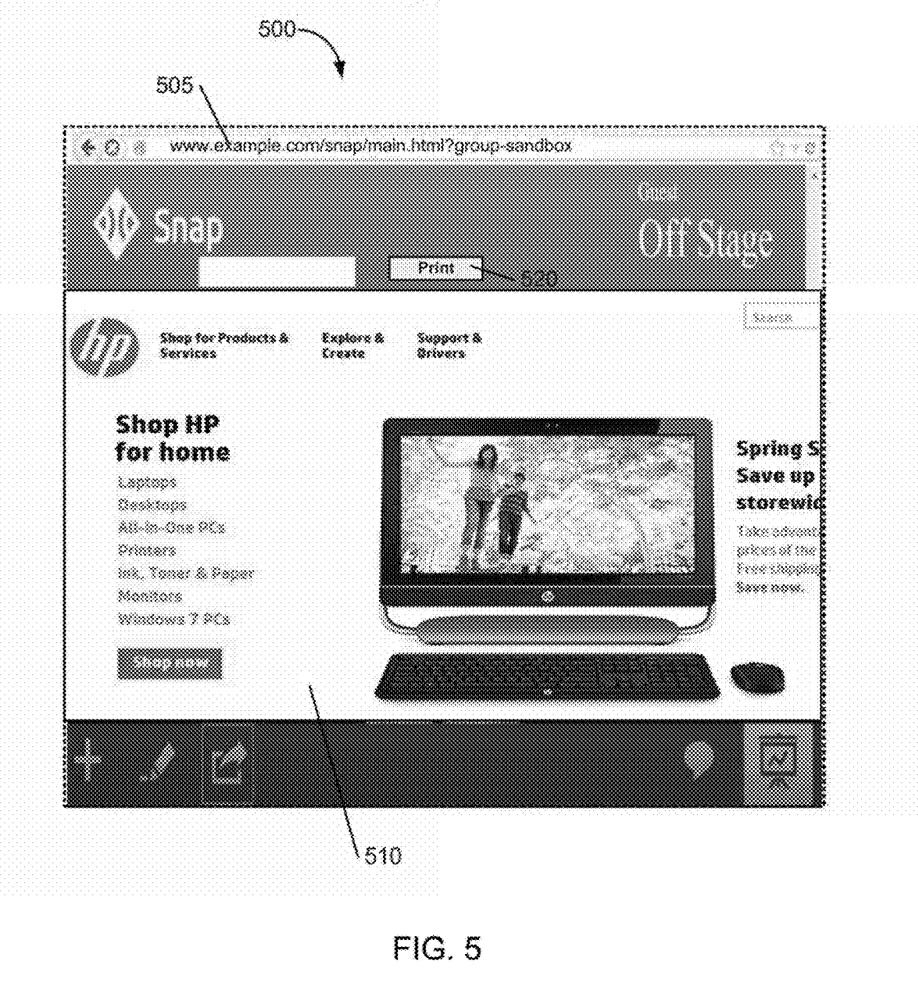
FIG. 5 illustrates a web-based user interface for sharing content between paired devices with the content sharing platform of FIG. 4 according to various examples.

Attention is now directed to FIG. 5, which shows the web-based user interface according to various examples. User interface 500 is displayed in a web browser client in a device (e.g., devices 110a-d and 435-450) upon a user entering a URL 505 corresponding to a content group in the web browser client. For example, a user may enter the URL 505 in a browser in his/her device to share content with other users in the content group identified as "sandbox" in URL 505. The user may open up a web page 510 to be shared with users in the group.

The user interface 500 is a cross-platform user interface that may be run on any web browser and platform, including, but not limited to, web browsers such as Internet Explorer, Mozilla Firefox, Google Chrome, and Safari, and platforms such as iOS and Android, among others. In addition, the same user interface 500 is run on different types of mobile devices, e.g., desktops, laptops, tablets, mobile phones, and so on. As appreciated by one skilled in the art, there may be some minor customizations done at the web browser client with regards to image resolution, compression, and other features tied to the mobile devices' display.

In order to share the content of the web page 510 with a second device (e.g., smart display or printer), the user follows the steps described above with reference to FIGS. 2 and 3A-B. That is, the first device accesses an encoded URL from the second device and provides a content group identifier to the second device(e.g., by having a cookie retrieve the content group name). Once the second device receives the content group identifier on the device channel, it subscribes to the content group channel in addition to the device channel. This device channel may be used to disassociate the content group from the second device or to send a new pairing request from a third device. Anytime new content is shown in the content group, references to the content are sent to the second device through the content group channel. In the case of a printer, the spooler service listens to any print requests by the user, such as by clicking on the Print button 520.

Figure 6:
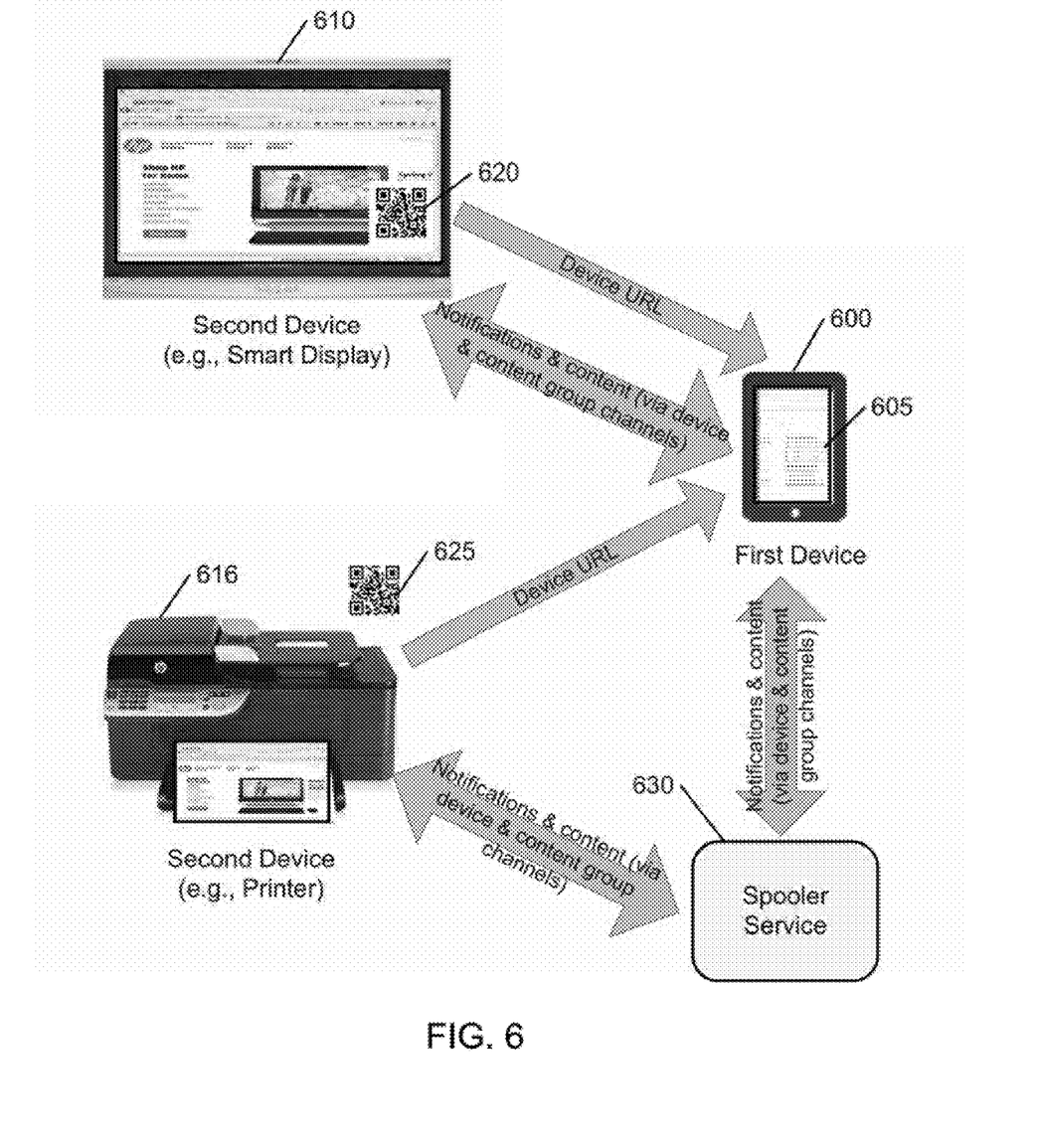
FIG. 6 illustrates a schematic diagram of content being shared between paired devices.

Attention is now directed to FIG. 6, which shows a schematic diagram illustrating how content is shared between paired devices. A user of a first device 600 would like to share content such as web page 605 with the smart display 610 and the printer 615. The user accesses an encoded device URL 620 at the smart display 610 and an encoded device URL 625 at the printer 615. In the case of the smart display 610, the encoded device URL 620 by opening up a web page corresponding to the content sharing platform user interface shown in FIG. 5 and retrieving the encoded device URL 620 from the page. In the case of the printer 615, the user may access the encoded device URL 625 by simply walking up to the printer 615 to read the encoded device URL 625 with a QR code reader. It is appreciated that the encoded device URLs 620 and 625 are shown as QR codes for purposes of illustration only. The device URLs associated with smart display 610 and printer 615 may be encoded as NFC tags or using any other alternative way to encode URLs.

Once the user of the first device 600 accesses the encoded device URLs 620-625 (e.g., by reading the encoded device URLs 620-625 with a QR code reader and opening them in a web browser), the user is redirected to a web page associated with the content sharing platform to identify a content group (e.g., through a cookie). The smart display 610 and the printer 615 are then notified that content is ready to be pushed from the user's device 600. The content in the content group is then pushed from the user's device 600 to the smart display 610 and printer 615. It is appreciated that in the case of the smart display 610, content is automatically displayed in the smart display 610 when the web socket channel between the user's device 600 and the smart display 610 is notified of new content in the content group. In the case of the printer 615, the content in the content group is sent to the printer 615 through the spooler service 630 when the user presses a print button (e.g., print button 520 shown in FIG. 5).

Figure 7:
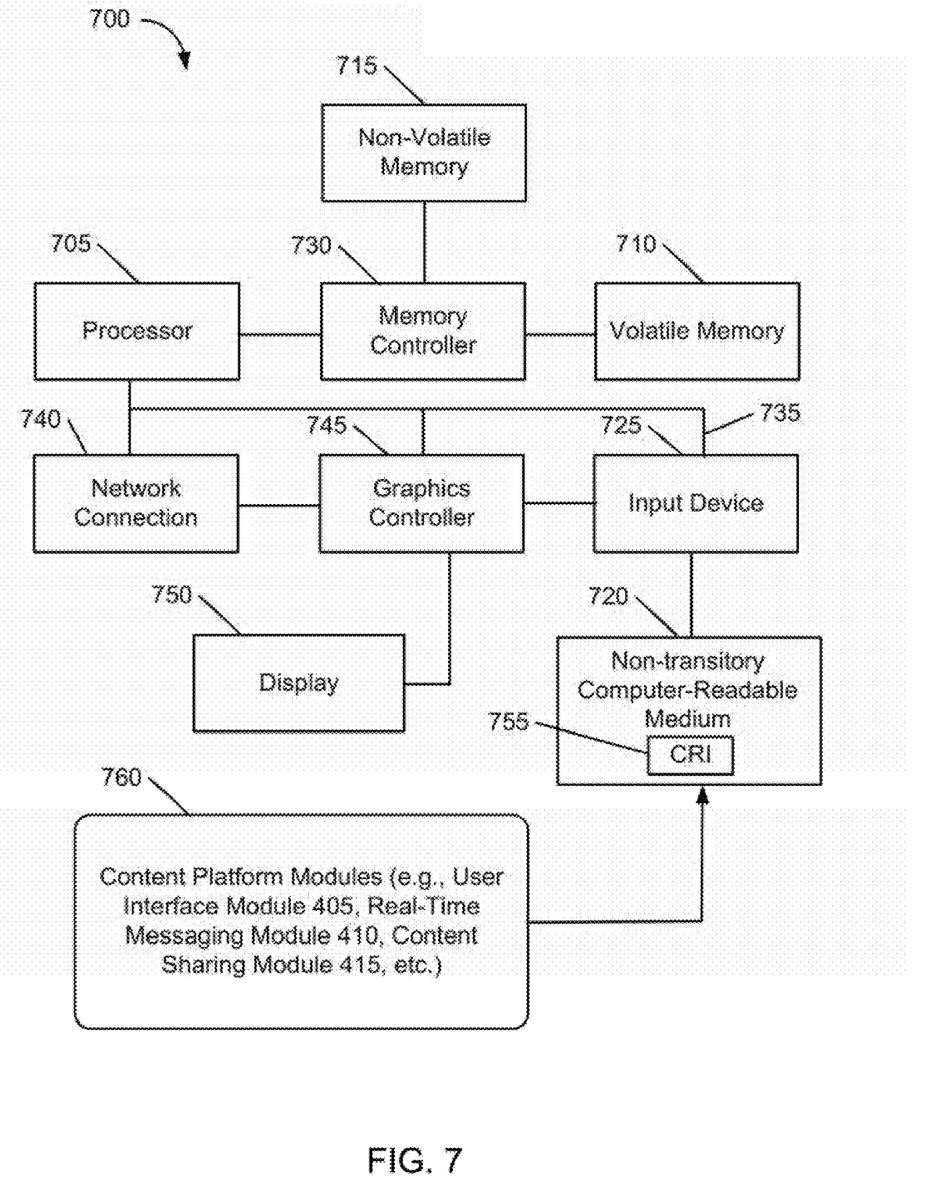
FIG. 7 illustrates a block diagram of an example computing system for hosting the modules of FIG. 4 according to various examples.

As described above, the modules used in the content sharing platform 400 of FIG. 4 may be hosted in a web server 420. Referring now to FIG. 7, a block diagram of an example computing system for hosting the modules of FIG. 4 according to various examples of the present disclosure is described. The computing system 700 (e.g., a web socket server) can include a processor 705 and memory resources, such as, for example, the volatile memory 710 and/or the non-volatile memory 715, for executing instructions stored in a tangible non-transitory medium (e.g., volatile memory 710, non-volatile memory 715, and/or computer readable medium 720) and/or an application specific integrated circuit ("ASIC") including logic configured to perform various examples of the present disclosure.

A machine (e.g., a computing device) can include and/or receive a tangible non-transitory computer-readable medium 720 storing a set of computer-readable instructions (e.g., software) via an input device 725. As used herein, the processor 605 can include one or a plurality of processors such as in a parallel processing system. The memory can include memory addressable by the processor 705 for execution of computer readable instructions. The non-transitory computer readable medium 720 can include volatile and/or non-volatile memory such as a random access memory ("RAM"), magnetic memory such as a hard disk, floppy disk, and/or tape memory, a solid state drive ("SSD"), flash memory, phase change memory, and so on. In some examples, the non-volatile memory 715 can be a local or remote database, including a plurality of physical non-volatile memory devices.

The processor 705 can control the overall operation of the computing system 700. The processor 705 can ne connected to a memory controller 730, which can read and/or write data from and/or to volatile memory 710 (e.g., RAM). The memory controller 730 can include an ASIC and/or a processor with its own memory resources (e.g., volatile and/or non-volatile memory). The volatile memory 710 can include one or a plurality of memory modules (e.g., chips). The processor 705 can be connected to a bus 735 to provide communication between the processor 705, the network connection 740, and other portions of the computing system 700. The non-volatile memory 715 can provide persistent data storage for the computing system 700. Further, the graphics controller 745 can connect to a display 750.

Each computing system 700 can execute computer-readable instructions that are stored on a non-transitory computer-readable medium 720. The non-transitory computer-readable medium 720 can be integral, or communicatively coupled, to computing device 700, in either a wired or wireless manner. For example, the non-transitory computer-readable medium 720 can be an internal memory, a portable memory, a portable disk, or a memory located internal to another computing resource (e.g., enabling the computer-readable instructions to be downloaded over the internet).

The non-transitory computer-readable medium 720 can have computer-readable instructions 755 stored thereon that are executed by the processor 705 to implement the modules of content sharing platform 400 (e.g., User Interface Module 400, Real-Time Messaging Module 410, Content Sharing Module 415, etc.) according to the present disclosure. The non-transitory computer-readable medium 720, as used herein, can include volatile and/or non-volatile memory. Volatile memory can include memory that depends upon power to store information, such as various types of dynamic random access memory ("DRAM"), among others. Non-volatile memory can include memory that does not depend upon power to store information. Examples of non-volatile memory can include solid state media such as flash memory, EEPROM, and phase change random access memory ("PCRAM"), among others. The non-transitory computer-readable medium 620 can include optical discs, digital video discs ("DVD"), Blu-Ray Discs, compact discs ("CD"), laser discs, and magnetic media such as tape drives, floppy discs, and hard drives, solid state media such as flash memory, EEPROM, PCRAM, as well as any other type of computer-readable medium.

Advantageously, the methods and modules of the content sharing platform 300 presented herein enable users to share content with other devices seamlessly and securely. The content sharing platform 400 is compatible with many types of mobile devices (e.g., laptops, mobile phones, tablets, etc.), operating systems (iOS, Android, etc.), web browsers (e.g., Internet Explorer, Mozilla Firefox, Safari, Google Chrome, etc.), and screen sizes (e.g., small to large). Users may instantly access the content sharing platform 300 without requiring any prior configuration. The content sharing platform 400 provides an interactive and collaborative content sharing experience, all with instant access and set-up. Users may send content to a smart display and to a printer by relying solely on the Internet capabilities of the display and printer. There is no need for the user to connect his/her device directly to the smart display. There is also no need for the user to download a printing application in his device—all the user has to do is get the encoded URL associated with the printer and press the print button within the user interface (e.g., user interface 500) of the content sharing platform.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein. For example, it is appreciated that the present disclosure is not limited to a particular computing system configuration, such as computing system 700.

What is claimed is:

1. A computer-implemented method for device pairing for content sharing, comprising:
    opening an encoded URL from a second device with a web browser in the first device, wherein the encoded URL encodes a unique device identifier for the second device and a web socket channel for communication with the first device;
    obtaining, by a transitional webpage from a redirected URL accessed by opening the encoded URL, the device identifier for the second device and the web socket channel from the encoded URL;
    obtaining, by the transitional webpage, a cookie from the first device, wherein the cookie identifies a last content group accessed by the first device;

providing a content group identifier of the last content group, determined from the cookie, to the second device;

notifying the second device that content is ready to be pushed to the second device from the first device through the last content group, wherein the last content group contains content on other devices; and pushing content from the first device to the second device through the last content group.

2. The computer-implemented method of claim 1, further comprising, at the second device, accessing a URL to obtain the encoded URL associated with the second device.

3. The computer-implemented method of claim 2, wherein the encoded URL is encoded in a Quick Response ("QR") code or a Near Field Communications ("NFC") tag.

4. The computer-implemented method of claim 1, wherein providing the content group identifier to the second device comprises
sending the content group identifier to the second device through the device channel.

5. The computer-implemented method of claim 1, wherein the first device comprises one of a desktop, a laptop, a tablet, a smart phone, a video game console, a smart watch, and a personal digital assistant.

6. The computer-implemented method of claim 1, wherein the second device comprises one of a smart display and a printer.

7. The computer-implemented method of claim 4, wherein notifying the second device that content is ready to be pushed to the second device comprises sending a message to the second device via the device channel.

8. The computer-implemented method of claim 6, wherein pushing content from the first device to the second device through the content group comprises sending references to the content in a content group channel, the content group identified by a content group identifier provided to the second device via the device channel.

9. A system for device pairing for content sharing, comprising:
a web user interface module for users to share, interact, and collaborate with content in a content group identified by a content group identifier;
a real-time messaging module to process events and messages between a first device and a second device to be paired; and
a content sharing module to interact with the real-time messaging module to push content from the first device to the second device through the content group identified by a content group identifier, the content pushed by:
opening an encoded URL from the second device with a web browser at the first device, wherein the encoded URL encodes a unique device identifier for the second device and a web socket channel for communication with the first device;
obtaining, by a transitional webpage from a redirected URL accessed by opening the encoded URL, the device identifier for the second device and the web socket channel from the encoded URL;
obtaining, by the transitional webpage, a cookie from the first device, wherein the cookie identifies a last content group accessed by the first device;
providing the content group identifier of the last content group, determined from the cookie, to the second device, wherein the last content group contains content on other devices.

10. The system of claim 9, wherein the transitional webpage is a webpage associated with a content sharing application.

11. The system of claim 10, wherein the cookie identifies the last content group accessed by the first device via the content sharing application.

12. The system of claim 9, wherein the real-time messaging module notifies the second device of content to be pushed to the second device via a web socket channel.

13. A non-transitory computer-readable medium comprising executable instructions to:
open an encoded URL from a second device with a web browser in a first device, wherein the encoded URL encodes a unique device identifier for the second device and a web socket channel for communication with the first device;
obtain, by a transitional webpage from a redirected URL accessed by opening the encoded URL, the device identifier for the second device and the web socket channel from the encoded URL;
obtain, by the transitional webpage, a cookie from the first device, wherein the cookie identifies a last content group accessed by the first device;
provide a content group identifier of the last content group, determined from the cookie, to the second device;
redirect the first device from the transitional webpage to a URL associated with the last content group content group;
notify the second device of the last content group, wherein the last content group contains content on other devices; and
push content from the first device to the second device through the last content group.

14. The non-transitory computer-readable medium of claim 13, wherein to notify the second device of the last content group comprises to notify the second device of the last content group via a web socket channel.

* * * * *